United States Patent
Gao et al.

(10) Patent No.: US 7,884,891 B2
(45) Date of Patent: Feb. 8, 2011

(54) THIN FILM TRANSISTOR LIQUID CRYSTAL DISPLAY

(75) Inventors: Wenbao Gao, Beijing (CN); Xinshe Yin, Beijing (CN); Xiangchun Xiao, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 162 days.

(21) Appl. No.: 12/273,630

(22) Filed: Nov. 19, 2008

(65) Prior Publication Data
US 2009/0185093 A1 Jul. 23, 2009

(30) Foreign Application Priority Data

Jan. 21, 2008 (CN) .......................... 2008 1 0056545
Jan. 25, 2008 (CN) .......................... 2008 1 0056896

(51) Int. Cl.
*G02F 1/136* (2006.01)
*G02F 1/1333* (2006.01)

(52) U.S. Cl. .............................. 349/43; 349/33; 349/40; 349/42

(58) Field of Classification Search ....................... None
See application file for complete search history.

(56) References Cited

U.S. PATENT DOCUMENTS

| | | | |
|---|---|---|---|
| 5,909,264 A * | 6/1999 | Fujikawa et al. | 349/49 |
| 6,864,703 B2 * | 3/2005 | Miyagawa et al. | 324/770 |
| 6,873,174 B2 * | 3/2005 | Matsunaga et al. | 324/770 |
| 7,046,030 B2 * | 5/2006 | Kim et al. | 324/770 |
| 2005/0093567 A1 * | 5/2005 | Nara et al. | 324/770 |
| 2007/0216821 A1 * | 9/2007 | Kim et al. | 349/38 |

* cited by examiner

*Primary Examiner*—Tina M Wong
(74) *Attorney, Agent, or Firm*—Ladas & Parry LLP (57) ABSTRACT

In a thin film transistor liquid crystal display (TFT-LCD), a connection is formed between the gate line and the common electrode line with TFTs. During scanning in one frame, a high voltage signal is applied to the pixels in a next row before the next row is turned on, i.e., a black image is inserted in the normal white mode. When the pixels in one row are in operation and the pixels in the next row are not turned on, a black image data is inserted into the next row. A high voltage is applied before the pixels in a row of the TFT-LCD are turned on, so that a black image is inserted and tailing of motion picture can be alleviated.

6 Claims, 5 Drawing Sheets

THIN FILM TRANSISTOR LIQUID CRYSTAL DISPLAY

FIELD OF THE INVENTION

The present invention relates to a thin film transistor liquid crystal display (TFT-LCD).

BACKGROUND OF THE INVENTION

TFT-LCDs have advantages of small size, low power consumption, low radiation, etc. TFT-LCDs developed fast in recent years and can offer better display performance with increase in size of display panel. In TFT-LCDs, a normal white driving mode is always adopted, in which a black image is displayed when a voltage is applied to pixel electrodes and the panel is transparent for light when no voltage is applied.

Figure 9:
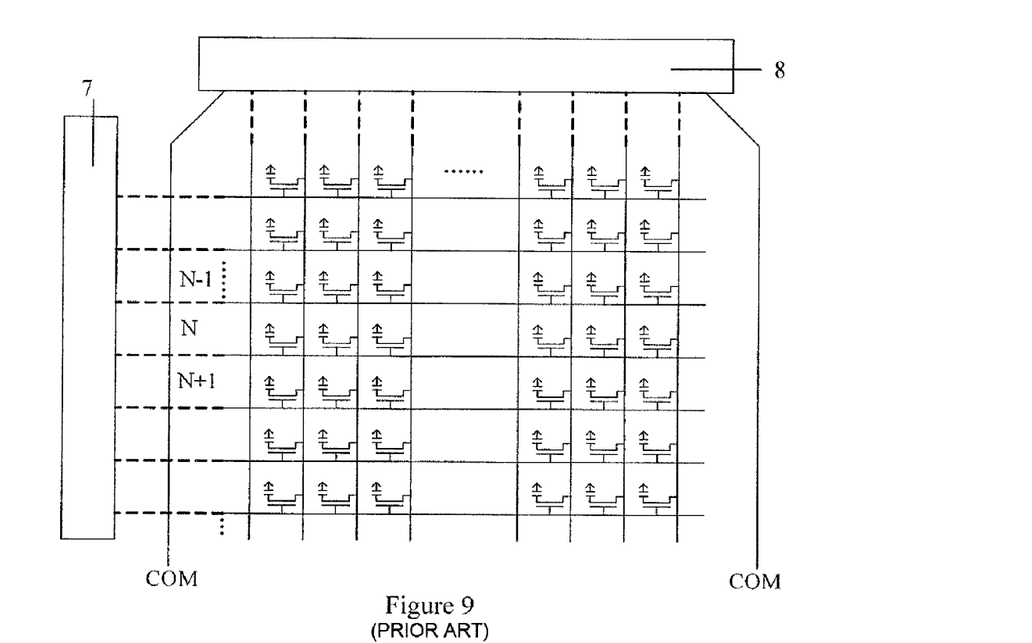
FIG. 9 is an equivalent circuit diagram of a conventional TFT-LCD.

FIG. 9 is an equivalent circuit diagram of a conventional TFT-LCD. As shown in FIG. 9, when the thin film transistor (TFT) as a switching element of each pixel is turned on, the data signal is transmitted to the pixel electrode of the pixel via the TFT. The voltage applied on the pixel electrode controls the orientation of the liquid crystal molecules in the liquid crystal cell so as to control the light passage. During scanning in one frame, the pixel voltage is maintained through a storage capacitor formed by the pixel electrode and a pixel common electrode line. That is, the pixel voltage is maintained by the storage capacitor (Cst) formed with the pixel common electrode line (Cst on Common). In the operation of the TFT-LCD, the TFTs are turned on in sequence, and data signals are introduced into the pixels in sequence. When the gate line in the nth row is applied with a high voltage (Vgh) and the TFTs in the nth row are turned on, the gate lines in remaining rows are applied with a low voltage signal (Vgl) so that the TFTs in these rows are turned off and the voltage of the pixels in these rows can be maintained with Cst.

Figure 10:
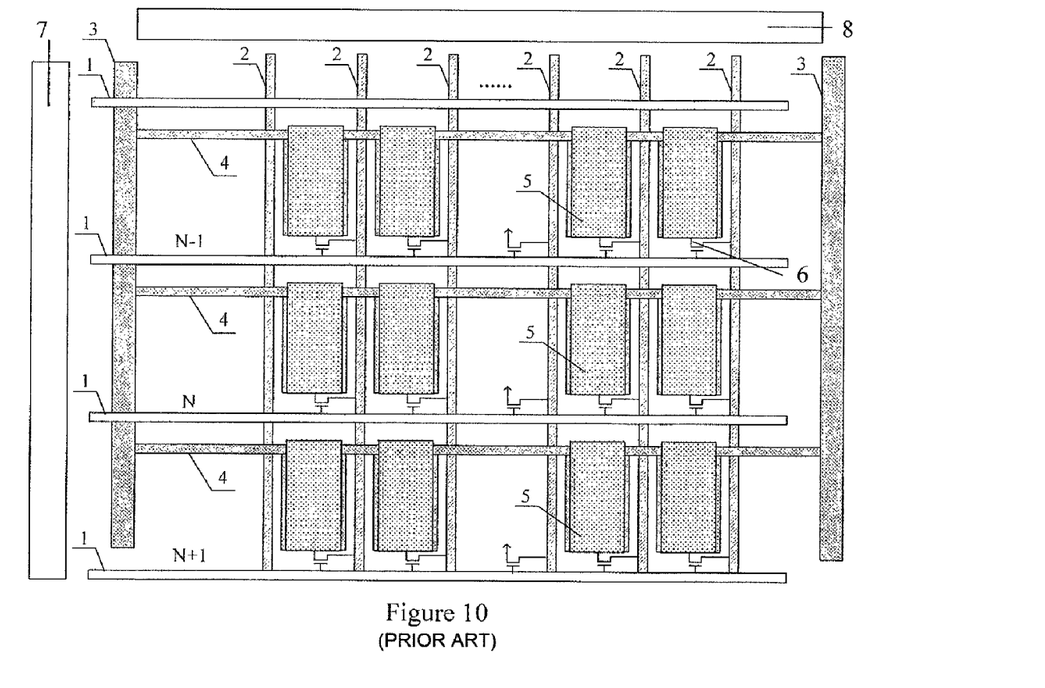
FIG. 10 is an equivalent circuit diagram of the design of Cst on Common in a conventional TFT-LCD.

FIG. 10 is an equivalent circuit diagram of the design of Cst on Common. A plurality of gate lines 1 and a plurality of data lines 2 intersect with each other to define a plurality of pixels, and each pixel has a pixel electrode 5 formed therein. For each pixel, the gate line, the data line, and the pixel electrode are interconnected with a three-terminal switching element, that is, a pixel TFT 6. A plurality of pixel common electrode lines 4 are provided for forming storage capacitors, and the pixel common electrode lines 4 are parallel to the gate lines 1 and partially overlap with the pixel electrodes 5 in each row. The pixel common electrode lines 4 are directly connected with a common electrode line 3 in the periphery region of the panel. Therefore, in operation, no matter whether the pixel is turned on, a same voltage is applied to the pixel common electrode line for forming the Cst. After the pixel electrode 5 is charged, the voltage applied on the pixel electrode (data) is maintained until the pixel is recharged in the next frame. When the next frame of image is coming, the image data is refreshed based on the current image. That is, after pixels in the nth row have been turned on and before pixels in the (n+1)th row are turned on, the original display information in the pixels in the (n+1)th row cannot be cleared in time, which causes visual residual and tailing of a motion picture. Thus, the conventional TFT-LCD modifies an existing image to display a new one, which causes visual residual and tailing of a motion picture and also renders a response speed and display quality degraded.

In addition, the gate signal applied on the gate line suffers from delay in transmission, which requires that the resistance of the gate line should be within a certain range, i.e., the line width should be controlled within a range. In design, shading strips are provided on a color filter substrate to shelter the gate line and the pixel common electrode line. Therefore, line width influences aperture ratio of a pixel, and in turn aperture ratio directly affects the ratio of light passing the pixel. If the aperture ratio is larger, the ratio of light passing the pixel is higher. Therefore, in the conventional TFT-LCD, increasing the line width of gate line to reduce signal delay on the gate line conflicts with increasing the aperture ratio of the pixel, and a compromise is needed between a large line width and a large aperture ratio.

SUMMARY OF THE INVENTION

One embodiment of the present invention provides a thin film transistor liquid crystal display (TFT-LCD) comprising: a peripheral common electrode line for providing a constant voltage; a plurality of pixel common electrode lines for maintaining a constant voltage; a plurality of gate lines for providing gate signals; a plurality of data lines for providing data signals, which intersect the gate lines to define a plurality of pixels in rows; a plurality of pixel electrodes, which are formed in the respective pixels and overlap with the respective pixel common electrode lines to form storage capacitors; a plurality of first thin film transistors (TFTs), for each of which, a gate and a source is connected with the gate line in the previous row, and a drain is connected with the pixel common electrode line in a same row; and a plurality of second TFTs, for each of which, a gate is connected with the gate line in the same row, a source is connected with the peripheral common electrode line, and a drain is connected with the pixel common electrode line in the same row.

Another embodiment of the present invention provides a thin film transistor liquid crystal display (TFT-LCD) comprising: a peripheral common electrode line for providing a constant voltage; a plurality of pixel common electrode lines for maintaining a constant voltage; a plurality of gate lines for providing gate signals; a plurality of data lines for providing data signals, which intersect the gate lines to define a plurality of pixels in rows; a plurality of first thin film transistors (TFTs), through one of which an end of one gate line is connected with one pixel common electrode line in a row next to the one gate line; a plurality of second TFTs, through one of which the peripheral common electrode line is connected with an end of the one pixel common electrode line; a plurality of third TFTs, through one of which the other end of the one pixel common electrode line is connected with the peripheral common electrode line; and a plurality of fourth TFTs, through one of which the other end of the one gate line is connected with the other end of the one pixel common electrode line in the row next to the gate line.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWING

The present invention will become more fully understood from the detailed description given hereinafter and the accompanying drawings which are given by way of illustration only, and thus are not limitative of the present invention and wherein.

DESCRIPTION OF THE PREFERRED EMBODIMENTS

The present invention will be described in detail below with reference to the accompanying drawings and the embodiments.

In the following embodiments, a first end refers to the end of the lines near the gate driver 7 on a panel, and a second end refers to the end of the lines away from the gate driver 7 on the panel.

First Embodiment

Figure 1:
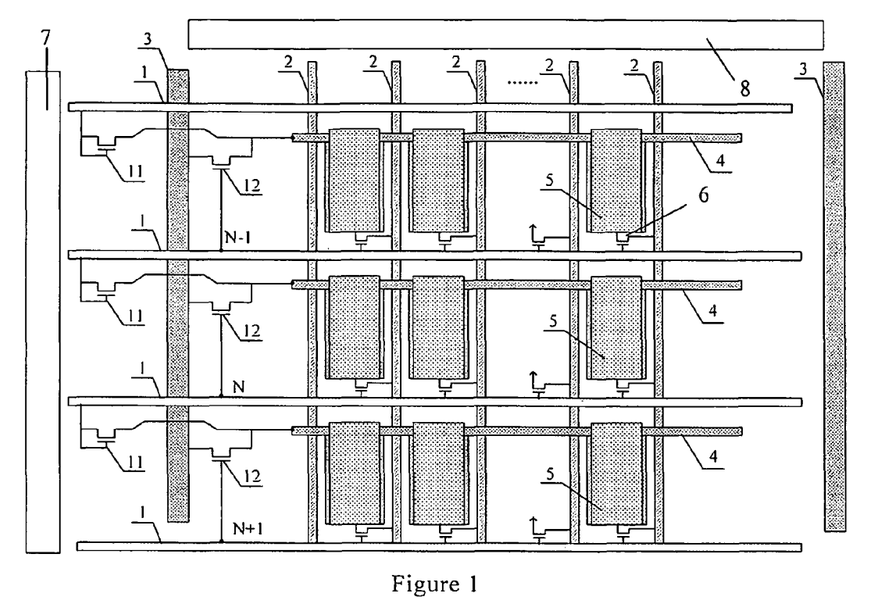
FIG. 1 is an equivalent circuit diagram of a TFT-LCD according to a first embodiment of the present invention.

FIG. 1 is an equivalent circuit diagram of a TFT-LCD according to the first embodiment of the present invention. As shown in FIG. 1, the TFT-LCD comprises: a peripheral common electrode line 3 for providing a constant voltage; a plurality of pixel common electrode lines 4 for maintaining a constant voltage; a plurality of gate lines 1 for providing gate signals; a plurality of data lines 2 for providing data signals, which intersect the gate lines 1 to define a plurality of pixels in rows; a plurality of pixel electrodes 5, each of which is provided in each pixel between one adjacent gate line 1 and one adjacent data line 2, is connected with, for example, the drain of a pixel TFT 6 as a switching element, and overlaps with the pixel common electrode line 4 in the same row to form a storage capacitor; a plurality of first TFTs 11, for each of which, the gate and the source is connected with the first end of the respective gate line 1 in the previous row, and the drain is connected with the first end of the pixel common electrode line 4 in the same row; and a plurality of second TFTs 12, for each of which, the gate is connected with the first end of the gate line 1 in the same row, the source is connected with the peripheral common electrode line 3, and the drain is connected with the first end of the pixel common electrode line 4 in the same row. In drawings, a gate driver 7 for controlling the gate lines is provided on the left side on a panel, and a data driver 8 for controlling the data lines is provided on the upper side on the panel, but this arrangement is not limitative.

The following description is made with reference to the (n−1)th, nth, and (n+1)th rows of the pixels on the panel. When the nth row is turned on, i.e., the nth row gate line 1 is applied with a high voltage signal (Vgh), the nth row pixel electrodes 5 are applied with the data signals transmitted from the data lines 2. The remaining rows are controlled by a low voltage signal (Vgl), so that the nth row first TFT 11 is turned off, while the nth row second TFT 12 is in operation. Therefore, the pixel common electrode line 4 in the nth row for forming the storage capacitor (Cst) is applied with a common voltage via the nth row second TFT 12, so that the nth row pixels can be charged normally and are in operation. At the same time, the (n+1)th first TFT 11 is turned on, i.e., the pixel common electrode line 4 in the (n+1)th row for forming storage capacitor (Cst) is also applied with the high voltage signal (Vgh). That is, when the nth row is in operation, the nth row gate line applies in advance a high voltage to the pixel common electrode line 4 of the storage capacitor (Cst) in the (n+1)th row before the (n+1)th row is turned on. As a result, a black image is displayed before the (n+1)th row is turned on, and motion blur can be alleviated.

According to the present embodiment, the LCD display is driven by inserting black data row by row, so that the image in a row can be cleared, i.e., the gray image is reset to a black image, before the image in the row is refreshed. In this way, the tailing caused by visual residual can be eliminated.

Second Embodiment

Figure 2:
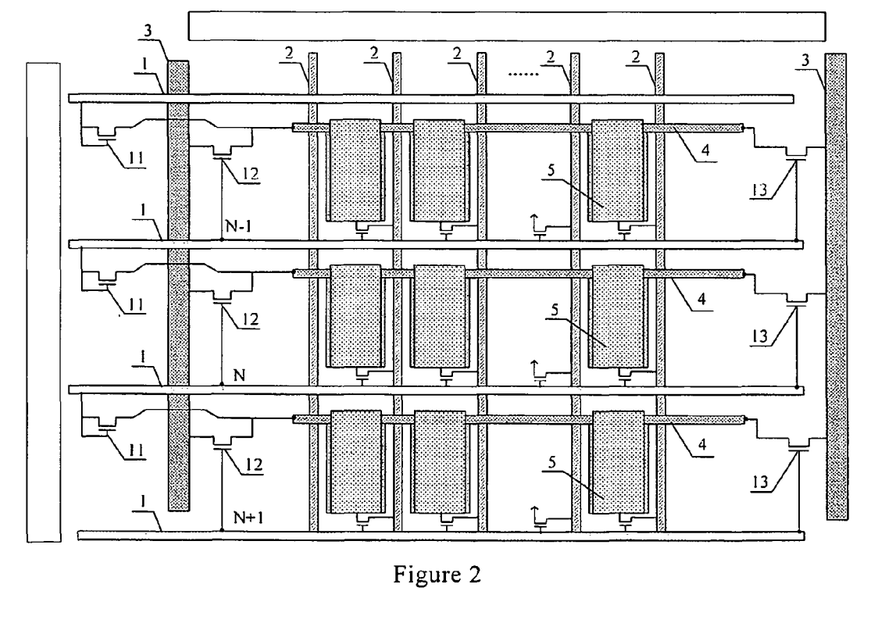
FIG. 2 is an equivalent circuit diagram of a TFT-LCD according to a second embodiment of the present invention.

FIG. 2 is an equivalent circuit diagram of the TFT-LCD according to the second embodiment of the present invention. As shown in FIG. 2, the second embodiment differs from the first embodiment in that the TFT-LCD further comprises a plurality of third TFTs 13. For each of the third TFTs 13, the gate is connected with the second end of the gate line 1 in the same row, the source is connected with the peripheral common electrode line 3, and the drain is connected with the second end of the pixel common electrode line 4 in the same row. The second TFTs 12 and the third TFTs 13 have the same function.

The following description is made with reference to the (n−1)th, nth, and (n+1)th rows of the pixels. When the nth row is turned on, i.e., the gate line 1 in the nth row is applied with a high voltage signal (Vgh), the nth row pixel electrodes 5 are applied with the data signal transmitted from the data lines 2. The remaining rows are controlled by a low voltage signal (Vgl), so that the nth row first TFT 11 is turned off, and the nth row second TFT 12 and the nth row third TFT 13 are in operation. Therefore, the pixel common electrode line 4 of the nth row storage capacitor (Cst) is applied with a common voltage from the peripheral common electrode line 3 via the nth row second TFT 12 and the nth row third TFT 13, so that the nth row pixels can be charged normally and are in operation. At the same time, the (n+1)th first TFT 11 is turned on, i.e., the pixel common electrode line 4 of the (n+1)th row storage capacitor (Cst) is also applied with the high voltage signal (Vgh). That is, when the nth row is in operation, the nth row gate line 1 applies in advance a high voltage to the pixel common electrode line 4 of the storage capacitor (Cst) in the (n+1)th row before the (n+1)th row is turned on. As a result, a black image is displayed before the (n+1)th row pixel is turned on, and motion blur can be alleviated.

According to the embodiment of the present invention, the LCD display is driven by inserting black data row by row, so that the image in a row can be cleared, i.e., the gray image is reset to a black image, before the image in the row is refreshed. In this way, the tailing caused by visual residual can be eliminated.

Third Embodiment

Figure 3:
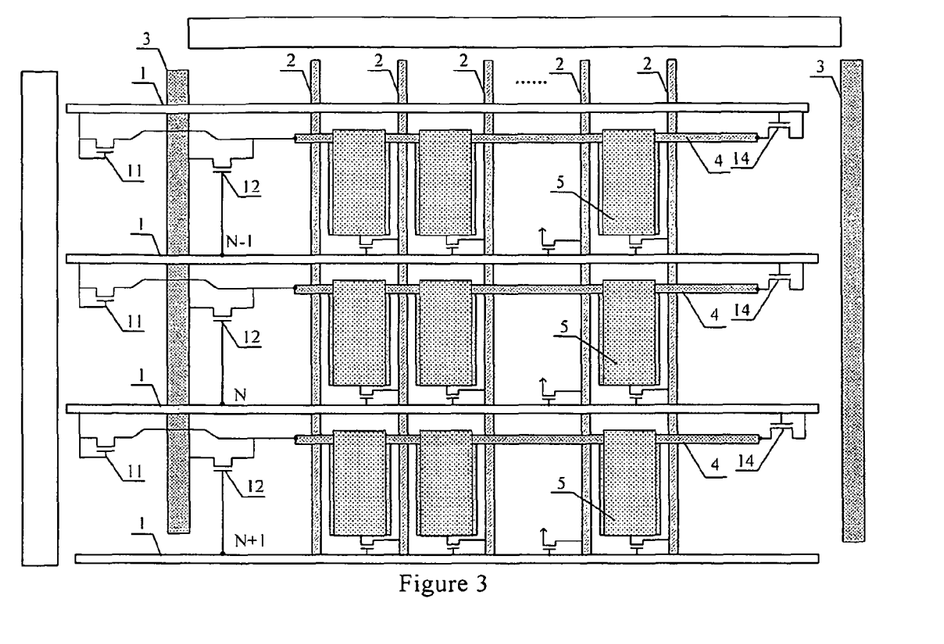
FIG. 3 is an equivalent circuit diagram of a TFT-LCD according to a third embodiment of the present invention.

FIG. 3 is an equivalent circuit diagram of the TFT-LCD according to the third embodiment of the present invention.

As shown in FIG. 3, the third embodiment differs from the first embodiment in that the TFT-LCD further comprises a plurality of fourth TFTs 14. For each of the fourth TFTs 14, the gate and the source are connected with the second end of the gate line 1 in the previous row, and the drain is connected with the second end of the pixel common electrode line 4 in the same row. The first TFTs 11 and the fourth TFTs 14 have the same function.

The following description is made with reference to the (n−1)th, nth, and (n+1)th rows of the pixels. When the nth row is turned on, i.e., the gate line 1 in the nth row is applied with a high voltage signal (Vgh), the nth row pixel electrodes 5 are applied with the data signal transmitted from the data lines 2. The remaining rows are controlled by a low voltage signal (Vgl), so that the nth row first TFT 11 and fourth TFT 14 are turned off, and the nth row second TFT 12 is in operation. Therefore, the pixel common electrode line 4 of the nth row storage capacitor (Cst) is applied with a common voltage from the peripheral common electrode line 3 via the second TFT 12, so that the nth row pixels can be charged normally and are in operation. At the same time, the (n+1)th first TFT 11 and fourth TFT 14 are turned on, i.e., the pixel common electrode line 4 of the (n+1)th row storage capacitor (Cst) is also applied with the high voltage signal (Vgh). That is, when the nth row is in operation, the nth row applies in advance a high voltage to the pixel common electrode line 4 of the storage capacitor (Cst) in the (n+1)th row before the (n+1)th row is turned on. As a result, a black image is displayed before the (n+1)th row pixel is turned on, and motion blur can be alleviated.

According to the embodiments of the present invention, the LCD display is driven by inserting black data row by row, so that the image in a row can be cleared, i.e., the gray image is reset to a black image, before the image in the row is refreshed. In this way, the tailing caused by visual residual can be eliminated.

Fourth Embodiment

Figure 4:
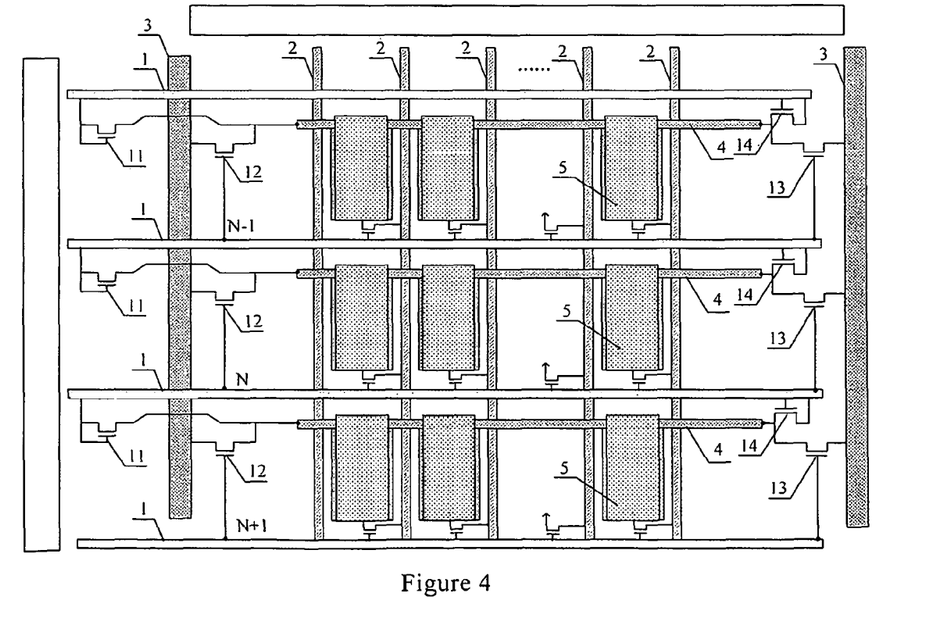
FIG. 4 is an equivalent circuit diagram of a TFT-LCD according to a fourth embodiment of the present invention.

FIG. 4 is an equivalent circuit diagram of the TFT-LCD according to the fourth embodiment of the present invention. As shown in FIG. 4, the fourth embodiment differs from the first embodiment in that the TFT-LCD further comprises a plurality of third TFTs 13 and a plurality of fourth TFTs 14. For each of the third TFTs 13, the gate is connected with the second end of the gate line 1 in the same row, the source is connected with the peripheral common electrode line 3, and the drain is connected with the second end of the pixel common electrode line 4 in the same row. For each of the fourth TFTs 14, the gate and the source are connected with the second end of the gate line 1 in the previous row, and the drain is connected with the second end of the pixel common electrode line 4 in the same row. The first TFTs 11 and the fourth TFTs 14 have the same function, and the second TFTs 12 and the third TFTs 13 have the same function.

The following description is made with reference to the (n−1)th, nth, and (n+1)th rows of the pixels. When the nth row is turned on, i.e., the gate line 1 in the nth row is applied with a high voltage signal (Vgh), the nth row pixel electrodes 5 are applied with the data signal transmitted from the data line 2. The remaining rows are controlled by a low voltage signal (Vgl), so that the nth row first TFT 11 and fourth TFT 14 are turned off, and the nth row second TFT 12 and third TFT 13 are in operation. Therefore, the pixel common electrode line 4 of the nth row storage capacitor (Cst) is applied with a common voltage from the peripheral common electrode line 3 via the second TFT 12 and the third TFT 13, so that the nth row pixels can be charged normally and are in operation. At the same time, the (n+1)th first TFT 11 and fourth TFT 14 are turned on, i.e., the pixel common electrode line 4 of the (n+1)th row storage capacitor (Cst) is also applied with the high voltage signal (Vgh). That is, when the nth row is in operation, the nth row applies in advance a high voltage to the pixel common electrode line 4 of the storage capacitor (Cst) in the (n+1)th row before the (n+1)th row is turned on. As a result, a black image is displayed before the (n+1)th row pixel is turned on, and motion blur can be alleviated.

According to the embodiment of the present invention, the LCD display is driven by inserting black data row by row, so that the image in a row can be cleared, i.e., the gray image is reset to a black image, before the image in the row is refreshed. In this way, the tailing caused by visual residual can be eliminated.

Fifth Embodiment

Figure 5:
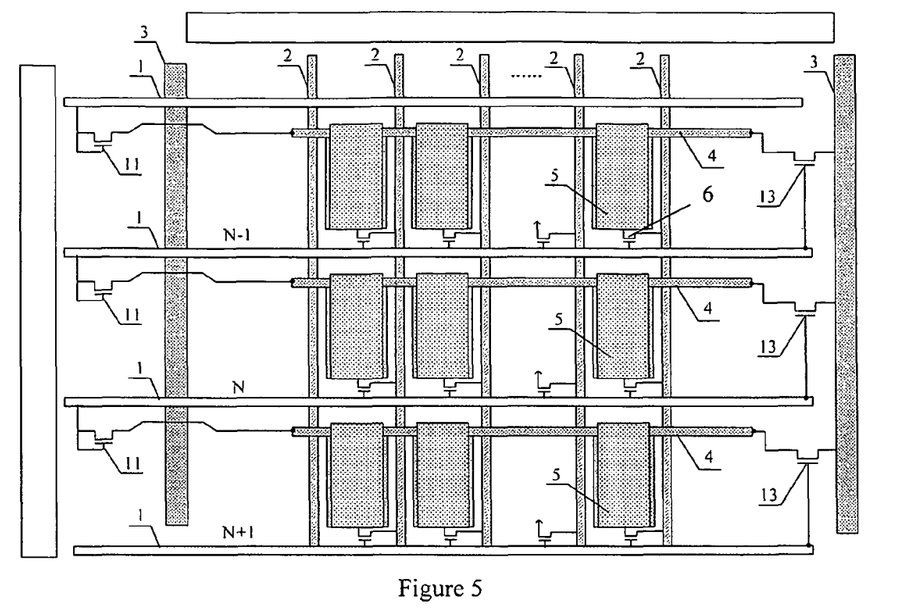
FIG. 5 is an equivalent circuit diagram of a TFT-LCD according to a fifth embodiment of the present invention.

FIG. 5 is an equivalent circuit diagram of a TFT-LCD according to the fifth embodiment of the present invention. As shown in FIG. 5, the TFT-LCD comprises: a peripheral common electrode line 3 for providing a constant voltage; a plurality of pixel common electrode lines 4 for maintaining a constant voltage; a plurality of gate lines 1 for providing gate signals; a plurality of data lines 2 for providing data signals, which intersect the gate lines 1 to define a plurality of pixels in rows; a plurality of pixel electrodes 5, each of which is formed in a pixel between one adjacent gate line 1 and one adjacent data line 2, is connected with the drain of a pixel TFT 6, and overlaps with the pixel common electrode line 4 in the same row to form a storage capacitor; a plurality of first TFTs 11, for each of which, the gate and the source is connected with the first end of the gate line 1 in the previous row, and the drain is connected with the first end of the pixel common electrode line 4 in the same row; a plurality of third TFTs 13, for each of which, the gate is connected with the second end of the gate line 1 in the same row, the source is connected with the peripheral common electrode line 3, and the drain is connected with the second end of the pixel common electrode line 4 in the same row.

The following description is made with reference to the (n−1)th, nth, and (n+1)th rows of the pixels. When the nth row is turned on, the nth row first TFT 11 is turned off, and the nth row third TFT 13 is in operation. Therefore, the pixel common electrode line 4 of the nth row storage capacitor (Cst) is applied with a common voltage via the third TFT 13, so that the nth row pixels can be charged normally and are in operation. At the same time, the (n+1)th first TFT 11 is turned on, i.e., the pixel common electrode line 4 of the (n+1)th row storage capacitor (Cst) is also applied with the high voltage signal (Vgh). That is, when the nth row is in operation, the nth row applies in advance a high voltage to the pixel common electrode line 4 of the storage capacitor (Cst) in the (n+1)th row before the (n+1)th row is turned on. As a result, a black image is displayed before the (n+1)th row pixel is turned on, and motion blur can be alleviated.

Sixth Embodiment

Figure 6:
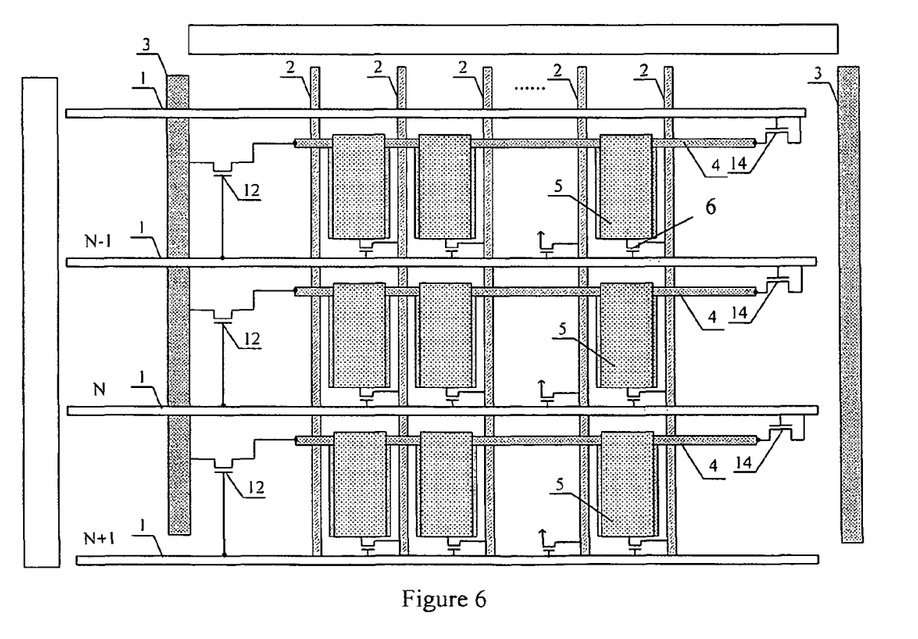
FIG. 6 is an equivalent circuit diagram of a TFT-LCD according to a sixth embodiment of the present invention.

FIG. 6 is an equivalent circuit diagram of a TFT-LCD according to the sixth embodiment of the present invention. As shown in FIG. 6, the TFT-LCD comprises: a peripheral common electrode line 3 for providing a constant voltage; a plurality of pixel common electrode lines 4 for maintaining a constant voltage; a plurality of gate lines 1 for providing gate signals; a plurality of data lines 2 for providing data signals, which intersect the gate lines defining a plurality of pixels; a plurality of pixel electrodes 5, each of which is formed in a pixel between one adjacent gate line 1 and one adjacent data line 2, is connected with the drain of a pixel TFT 6, and overlaps with the pixel common electrode line 4 in the same row to form a storage capacitor; a plurality of second TFTs 12, for each of which, the gate is connected with the first end of the gate line 1 in the same row, the source is connected with the peripheral common electrode line 3, and the drain is connected with the first end of the pixel common electrode line 4 in the same row; a plurality of fourth TFTs 14, for each of which, the gate and the source are connected with the second end of the gate line 1 in the previous row, and the drain is connected with the second end of the pixel common electrode line 4 in the same row.

The following description is made with reference to the (n−1)th, nth, and (n+1)th rows of the pixels. When the nth row is turned on, the nth row fourth TFT 14 is turned off, and the nth row second TFT 12 is in operation. Therefore, the pixel common electrode line 4 of the nth row storage capacitor (Cst) is applied with a common voltage via the second TFT 12, so that the nth row pixels can be charged normally and are in operation. At the same time, the (n+1)th fourth TFT 14 is turned on, i.e., the pixel common electrode line 4 of the (n+1)th row storage capacitor (Cst) is also applied with the high voltage signal (Vgh). That is, when the nth row is in operation, the nth row applies in advance a high voltage to the pixel common electrode line 4 of the storage capacitor (Cst) in the (n+1)th row before the (n+1)th row is turned on. As a result, a black image is displayed before the (n+1)th row pixel is turned on, and motion blur can be alleviated.

Seventh Embodiment

Figure 7:
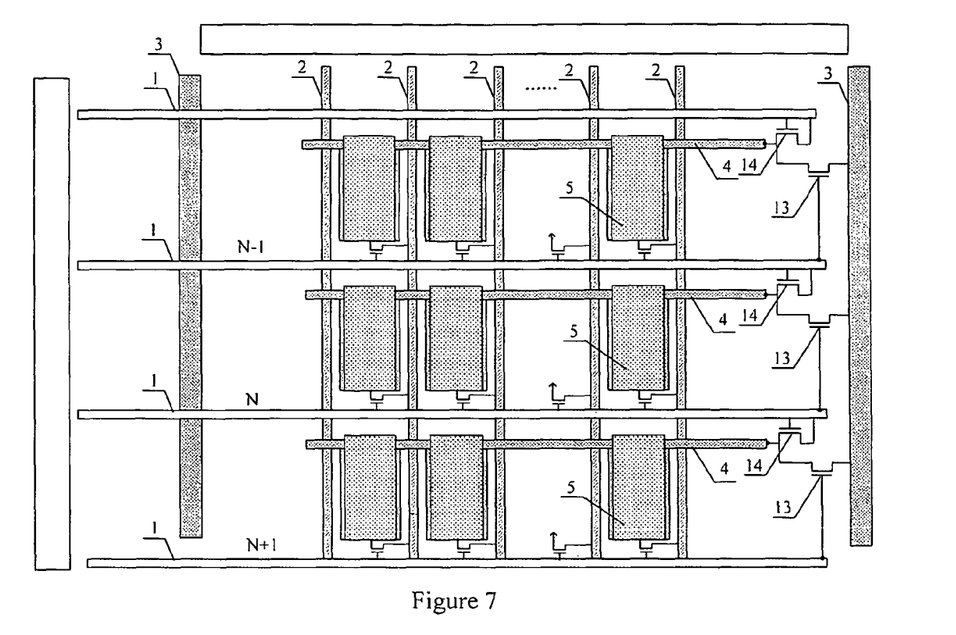
FIG. 7 is an equivalent circuit diagram of a TFT-LCD according to a seventh embodiment of the present invention.

FIG. 7 is an equivalent circuit diagram of the TFT-LCD according to the seventh embodiment of the present invention. As shown in FIG. 7, the seventh embodiment differs from the fourth embodiment in that the driving device comprises the third TFTs 13 and the fourth TFTs 14 instead of the first TFTs 11 and the second TFTs 12 in the first embodiment. Similarly, the image in a row can be cleared, i.e., the gray image is reset to a black image, before the image in the row is refreshed. In this way, the tailing caused by visual residual can be alleviated. However, since the third TFTs 13 and the fourth TFTs 14 are away from the gate driver 7, signal delay may be caused with the increase of the line distance of the pixel common electrode line 4. Although the flickering of image may occur, the technical solution in this embodiment can work to reduce motion blur.

Eighth Embodiment

Figure 8:
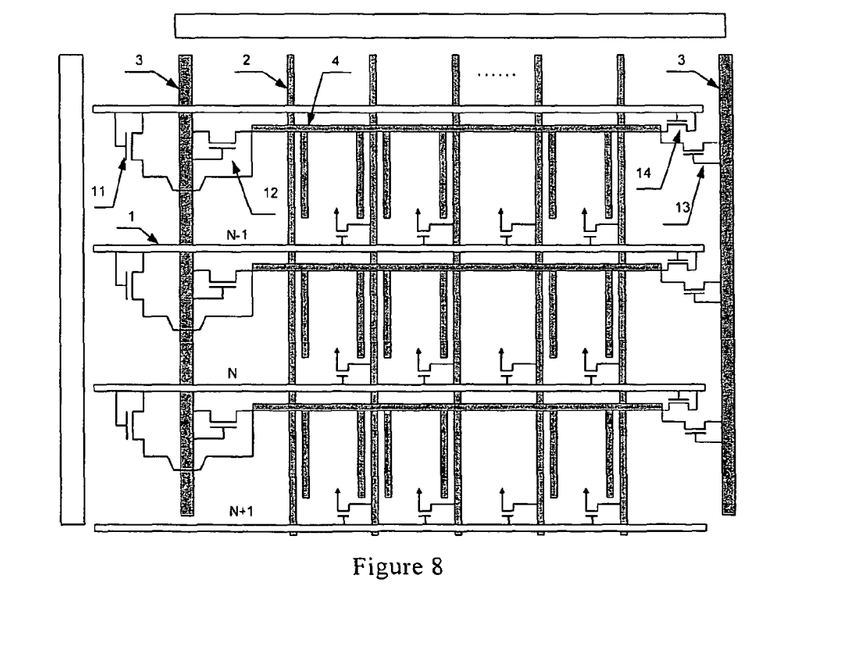
FIG. 8 is an equivalent circuit diagram of a TFT-LCD according to an eighth embodiment of the present invention.

As shown in FIG. 8, the TFT-LCD of the present embodiment comprises: a peripheral common electrode line 3 for providing a constant voltage; a plurality of pixel common electrode lines 4 for maintaining a constant voltage; a plurality of gate lines 1 for providing gate signals; a plurality of data lines 2 intersecting with the gate lines 1 to define a plurality of pixels in rows; a plurality of first TFTs 11, through one of which an end of one gate line 1 is connected with one pixel common electrode line 4 in the row next to the gate line 1; a plurality of second TFTs 12, through one of which the peripheral common electrode line 3 is connected with an end of the pixel common electrode line 4; a plurality of third TFTs 13, through one of which the peripheral common electrode line 3 is connected with the other end of the pixel common electrode line 4; and a plurality of fourth TFTs 14, through one of which the other end of the gate line 1 is connected with the other end of the pixel common electrode line 4 in the row next to the gate line 1.

As shown in FIG. 8, in the present embodiment, the gate and the source of the first TFT 11 are connected with one gate line 1, the drain of the first TFT 11 is connected with the pixel common electrode line 4 in the row next to the gate line 1; the gate and the source of the second TFT 12 are connected with the peripheral common electrode line 3, the drain of the second TFT 12 is connected with the pixel common electrode line 4. Further in this embodiment, the gate and the source of the third TFT 13 are connected with the peripheral common electrode line 3, the drain of the third TFT 13 is connected with the other end of the pixel common electrode line 4; the gate and the source of the fourth TFT 14 are connected with the other end of the gate line 1, the drain of the fourth TFT 14 is connected with the other end of the pixel common electrode line 4 in the row next to the gate line 1.

The following description is made with reference to the (n−1)th, nth, and (n+1)th rows of the pixels. When the (n−1)th row gate line 1 is applied with a high voltage signal (Vgh) and is turned on, the nth row first TFT 11 is turned on. At the same time, the same high voltage signal (Vgh) is applied to the pixel common electrode line of the nth row storage capacitor (Cst), and this signal is transmitted to the rightmost side of the panel together with the signal on the gate line 1. The fourth TFT 14 is also turned on at this time. Therefore, the input end of the gate line 1 is connected with the pixel common electrode line 4 in the row next to the gate line 1 via the first TFT 11, and is further connected with the output end of the gate line 1 via the fourth TFT 14, so that another path is formed. These two paths have the same potential and transmit the gate signal simultaneously, which in effect reduces the resistance of the signal passage. When a high voltage signal (Vgh) is applied to the nth row, the remaining rows are controlled by a low voltage signal (Vgl), so that the nth row second TFT 12 is in operation, and the nth row third TFT 13 at the rightmost side of the panel is also in operation. At the same time, the (n+1)th row first TFT 11, as well as the (n+1)th row fourth TFT 14 at the rightmost side of the panel, is turned off. Therefore, the two peripheral common electrode lines 3 on the two sides of the panel are connected with each other via the second TFT 12, the third TFT 13, and the pixel common electrode line 4 in the (n+1)th row. The nth row storage capacitor is still applied with the signal voltage of the peripheral common electrode lines 3, and the nth row can be charged normally.

That is, when a row is applied with a high voltage signal, there are two paths for the row which transmit the gate signal, i.e., the original gate line 1 and the path which is formed by connecting the input end and output end of the gate line 1 to the pixel common electrode line 4 in the row next to the gate line 1 via the first TFT 11 and the fourth TFT 14, respectively. When a row is applied with a low voltage signal, the first TFT 11 and the fourth TFT 14 in the row are turned off, and the peripheral common electrode lines 3 are connected by the second TFT 12, the third TFT 13, and the pixel common electrode line 4 in the row, as the common electrode of the storage capacitors.

The structure and design method described above can not only effectively reduce the resistance of the gate line and the delay of signal, but also make a compromise between the aperture ratio and the increase of the line width which is necessary to reduce the signal delay on the gate line.

It should be appreciated that the embodiments described above are intended to illustrate but not limit the present invention. Although the present invention has been described in detail herein with reference to the preferred embodiments, it should be understood by those skilled in the art that the present invention can be modified and some of the technical features can be equivalently substituted without departing from the spirit and scope of the present invention.

What is claimed is:

1. A thin film transistor liquid crystal display (TFT-LCD) comprising:
 a peripheral common electrode line for providing a constant voltage;
 a plurality of pixel common electrode lines for maintaining a constant voltage;
 a plurality of gate lines for providing gate signals;
 a plurality of data lines for providing data signals, which intersect the gate lines to define a plurality of pixels in rows;
 a plurality of pixel electrodes, which are formed in the respective pixels and overlap with the respective pixel common electrode lines to form storage capacitors;
 a plurality of first thin film transistors (TFTs), for each of which, a gate and a source is connected with the gate line in the previous row, and a drain is connected with the pixel common electrode line in a same row; and
 a plurality of second TFTs, for each of which, a gate is connected with the gate line in the same row, a source is connected with the peripheral common electrode line, and a drain is connected with the pixel common electrode line in the same row.

2. The TFT-LCD according to claim 1, wherein
 for each of the first TFTs, the gate and the source is connected with a first end of the gate line 1 in the previous row, and the drain is connected with a first end of the pixel common electrode line in the same row; and
 for each of the second TFTs, the gate is connected with the first end of the gate line in the same row, the source is connected with the peripheral common electrode line, and the drain is connected with the first end of the pixel common electrode line in the same row, and the first end of the lines is near a gate driver.

3. The TFT-LCD according to claim 2, further comprising:
 a plurality of third TFTs, for each of which, a gate is connected with a second end of the gate line in the same row, a source is connected with the peripheral common electrode line, and a drain is connected with a second end of the pixel common electrode line in the same row, and the second end of the lines is away from the gate driver.

4. The TFT-LCD according to claim 3, further comprising:
 a plurality of fourth TFTs, for each of which, a gate and a source are connected with the second end of the gate line in the previous row, and a drain is connected with the second end of the pixel common electrode line in the same row.

5. The TFT-LCD according to claim 2, further comprising:
 a plurality of fourth TFTs, for each of which, a gate and a source are connected with a second end of the gate line in the previous row, and a drain is connected with a second end of the pixel common electrode line in the same row, and the second end of the lines is near the gate driver.

6. The TFT-LCD according to claim 1, wherein
 for each of the first TFTs, the gate and the source is connected with a first end of the gate line in the previous row, and the drain is connected with a first end of the pixel common electrode line in the same row;
 for each of the second TFTs, the gate is connected with a second end of the gate line in the same row, the source is connected with the peripheral common electrode line, and the drain is connected with a second end of the pixel common electrode line in the same row; and
 the first end of the lines is near a gate driver and the second end of the lines is away from the gate diver.

* * * * *